Patented Feb. 22, 1927.

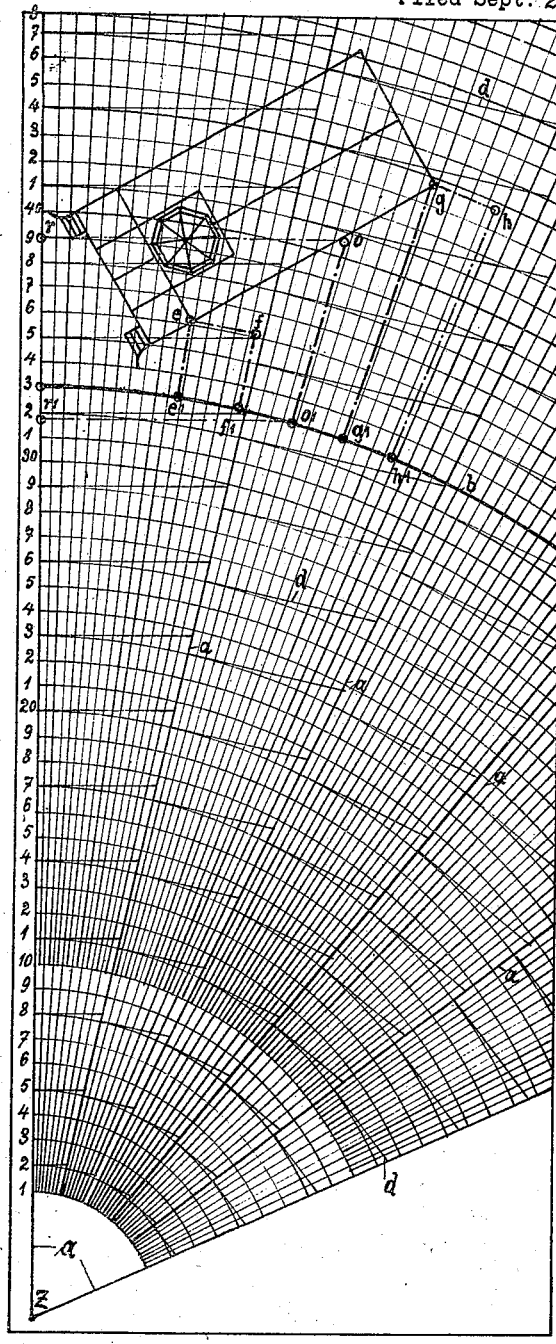
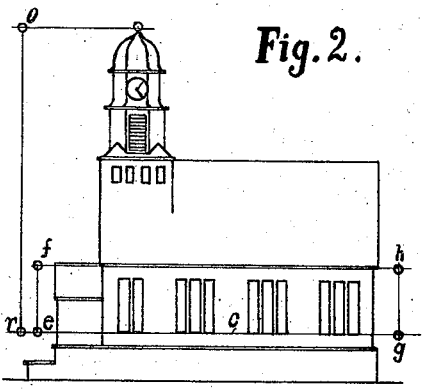
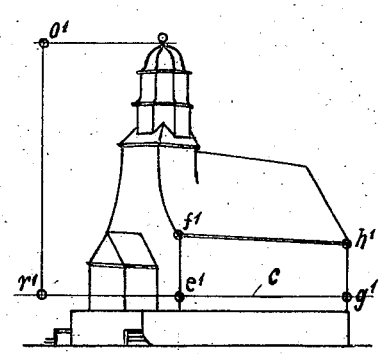
Fig. 2.
Fig. 3.
Fig. 1.
Inventor:
Hermann Birker

1,618,164

UNITED STATES PATENT OFFICE.

HERMANN BIRKER, OF DUSSELDORF, GERMANY.

PERSPECTIVE CHART.

Application filed September 22, 1923, Serial No. 664,315, and in Germany October 9, 1922.

In order to obtain correct proportions in perspective drawings it has been proposed to employ a transparent sheet having a network of intersecting lines drawn from and about a common center, said sheet being placed on a plan view so that the latter occupies the same position relative to the center as the real object relative to the view point, the perspective distances between the various points of the plan being then determined by projecting these points radially on to one of the circles while the perspective heights are obtained by projecting the actual heights from the position occupied by the respective elements in the plan on to the same circle which represents the plane in which the object is seen.

The object of the present invention is to facilitate the process, and the invention consists in the first place in replacing the transparent sheet by an opaque card for use with a transparent plan. This arrangement allows the ordinary tracings made of almost every plan to be used in connection with the card bearing the net-work, and the latter will be more durable since it will not be damaged by the compass points.

In the second place the card is provided with prominent radial lines and also with tangential lines which latter are used instead of the circular lines for obtaining the heights. This feature also facilitates the process and produces more accurate results.

Fig. 1 of the accompanying drawings represents a view of the card showing a plan placed thereon for projection.

Fig. 2 is a side view of the object, and

Fig. 3, the resulting perspective view of the same.

An opaque card is provided with a network of intersecting lines drawn from and around a common center $z$. The center is preferably placed at one corner of the card, the first radial line $a$ being vertical. The circular lines $b$ may be numbered for reference from the center upwards, as shown in Fig. 1. Some of the radial lines may be rendered prominent, and from these tangents $d$ are drawn to some of the circles.

In using the card, a plan of the object is drawn on transparent paper and placed on the card in the same position relative to the center $z$ as the object is to occupy relative to the view point. One of the circles $b$ is then chosen as the plane in which the object is to be seen, and from this circle, the radial lines $b$ being used as projection lines, the horizontal relative distances of the various points of the plan from each other, can be found for the perspective view. The elevation of the different points is obtained for instance from a side view drawn to the same scale as the plan. A horizontal line $c$, representing the level of the line of sight, is drawn across the side view, and from this line the heights are measured and set off on the card at the corresponding points of the plan, the perspective heights being found by radial projection onto the circle passing through the plane of sight. For instance the distance $g^1-h^1$ in Fig. 3 is found by setting off the actual distance $g-h$ at the corresponding corner of the plan tangentially to the circles, as shown in Fig. 1. Where the radial lines from the two points $g$, $h$ intersect the plane of sight, their distance apart equals $g^1-h^1$. The distance $e^1-f^1$ is found in the same manner, by setting off the distance $e-f$ on the card and projecting it onto the plane of sight. The distance $r^1-o^1$ in Fig. 3, i. e., the height of the spire, is found by setting off the true height $r-o$ along a tangent $d$ passing through the spire point in the plan. The distance $r^1-o^1$ is measured off, parallel to the original tangent, from the point of intersection $o^1$ of one of the radii with the plane of sight to the opposite radius.

I claim:—

A device of the character described for obtaining correct proportions in perspective drawings, consisting of an opaque card having a net-work of radial and concentric lines drawn from and about a common center situated at one corner of the card, some of the radial lines being more prominent than others, and tangential lines drawn from said prominent radial lines to some of the circular lines, substantially as and for the purpose set forth.

HERMANN BIRKER.